United States Patent
Xu et al.

(10) Patent No.: US 9,379,880 B1
(45) Date of Patent: Jun. 28, 2016

(54) CLOCK RECOVERY CIRCUIT

(71) Applicant: Xilinx, Inc., San Jose, CA (US)

(72) Inventors: Yu Xu, Palo Alto, CA (US); Yohan Frans, Palo Alto, CA (US); Kun-Yung Chang, Los Altos Hills, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/795,150

(22) Filed: Jul. 9, 2015

(51) Int. Cl.
*H04L 7/02* (2006.01)
*H04L 7/00* (2006.01)
*H04L 7/04* (2006.01)
*H04L 7/10* (2006.01)

(52) U.S. Cl.
CPC ............... *H04L 7/002* (2013.01); *H04L 7/041* (2013.01); *H04L 7/10* (2013.01)

(58) Field of Classification Search
CPC ...... H04L 7/033; H04L 7/027; H04L 25/4904; H04L 7/0331; H04L 7/0337; H04L 7/0338; G11B 20/1403; H03L 7/0814
USPC .................................................. 375/354–376
See application file for complete search history.

(56) References Cited

U.S. PATENT DOCUMENTS

| | | | | |
|---|---|---|---|---|
| 6,509,773 B2* | 1/2003 | Buchwald | ............... | H03L 7/0814 327/248 |
| 6,901,126 B1* | 5/2005 | Gu | ................... | H03L 7/0998 375/354 |
| 7,099,424 B1* | 8/2006 | Chang | ................... | H03L 7/07 327/277 |
| 7,363,563 B1* | 4/2008 | Hissen | ................... | H04L 1/243 327/144 |
| 7,643,996 B1* | 1/2010 | Gottesman | ............ | G10L 19/097 704/205 |
| 7,885,353 B2* | 2/2011 | Nakadaira | .............. | H04B 15/04 327/114 |
| 8,791,734 B1* | 7/2014 | Hara | ....................... | H03L 7/146 327/156 |
| 8,934,594 B1* | 1/2015 | Malhotra | ............ | H04L 27/2338 375/355 |
| 8,976,050 B1* | 3/2015 | Dedic | ................. | H03M 1/0624 341/110 |
| 9,191,194 B2* | 11/2015 | Robertson | ................ | H04L 7/04 |
| 9,209,960 B1* | 12/2015 | Leung | ..................... | H04L 7/002 |
| 2003/0198105 A1* | 10/2003 | Yamaguchi | .......... | G11C 7/1078 365/200 |
| 2004/0158759 A1* | 8/2004 | Chang | ....................... | G06F 1/06 713/500 |
| 2004/0169539 A1* | 9/2004 | Gauthier | ................ | H03K 5/135 327/231 |
| 2004/0213337 A1* | 10/2004 | Li | ....................... | H04L 27/2657 375/222 |
| 2005/0180536 A1* | 8/2005 | Payne | ................... | H03L 7/0814 375/354 |
| 2005/0238126 A1* | 10/2005 | Ribo | ..................... | H03L 7/0814 375/355 |
| 2006/0251154 A1* | 11/2006 | Ettorre | ................. | H04B 1/7085 375/148 |

(Continued)

OTHER PUBLICATIONS

Specification and drawings for U.S. Appl. No. 14/715,280, filed May 18, 2015, Xu et al.

*Primary Examiner* — James M Perez
(74) *Attorney, Agent, or Firm* — LeRoy D. Maunu (57) ABSTRACT

Clock data recovery can be accomplished using a phase change determination circuit that generates, based upon detected phase differences between a capture clock signal and data signal, a delta signal and a delta selection signal. A calculation circuit generates a set of phase interpolation (PI) codes from prior and speculative values of the delta signal. A selection circuit selects, in response to the delta selection signal, between the sets of PI codes, which are provided as an output of the clock data recovery device.

20 Claims, 6 Drawing Sheets

(56) References Cited

U.S. PATENT DOCUMENTS

| | | | | |
|---|---|---|---|---|
| 2007/0018704 A1* | 1/2007 | Ishii | H03L 7/0814 | 327/165 |
| 2008/0292040 A1* | 11/2008 | Menolfi | H03D 3/006 | 375/376 |
| 2010/0283525 A1* | 11/2010 | Yoshikawa | H03K 3/84 | 327/237 |
| 2010/0327936 A1* | 12/2010 | Mosalikanti | G01R 31/2894 | 327/291 |
| 2012/0039426 A1* | 2/2012 | Onodera | H04L 7/002 | 375/355 |
| 2012/0207259 A1* | 8/2012 | Crain | H03L 7/0807 | 375/371 |
| 2013/0058437 A1* | 3/2013 | Oshima | H03M 1/0836 | 375/316 |
| 2014/0118172 A1* | 5/2014 | Gong | H03M 1/0673 | 341/144 |
| 2014/0204988 A1* | 7/2014 | Wei | H03K 5/133 | 375/226 |
| 2014/0241442 A1* | 8/2014 | Ahmadi | H03L 7/00 | 375/259 |
| 2014/0253195 A1* | 9/2014 | Chandrasekaran | H03K 5/1565 | 327/175 |
| 2015/0043695 A1* | 2/2015 | Suzuki | H04L 7/02 | 375/362 |
| 2015/0070202 A1* | 3/2015 | Dedic | H03K 17/063 | 341/144 |
| 2015/0146834 A1* | 5/2015 | Marshall | H04L 7/0025 | 375/376 |
| 2015/0180642 A1* | 6/2015 | Hsieh | H04L 7/0025 | 375/233 |
| 2015/0200765 A1* | 7/2015 | Bonaccio | H04L 7/0029 | 375/374 |
| 2015/0200768 A1* | 7/2015 | Shibasaki | H03L 7/0807 | 375/355 |
| 2015/0229298 A1* | 8/2015 | Tomita | H03K 3/012 | 375/376 |
| 2015/0326229 A1* | 11/2015 | Boecker | H03L 7/0814 | 327/158 |

\* cited by examiner

CLOCK RECOVERY CIRCUIT

TECHNICAL FIELD

The disclosure generally relates to clock and data recovery circuits, and more particularly to circuits for a circuit path configured to recover a clock signal from received data using speculative calculations.

BACKGROUND

Clock and data recovery (CDR) circuits can be used with various communication protocols to generate a synchronized clock signal from received data. CDR circuits can allow for high speed data streams to be sent without a separate, dedicated, clock signal. For instance, a CDR circuit can be configured to infer clock signal timings (phase and frequency) from received data in the analog realm and make adjustments directly to a phase locked loop (PLL) or a delay locked loop (DLL). Certain types of CDR circuits can be configured to be based upon phase interpolation (PI) in which a set of reference clock signals are used to produce different phases. The CDR circuit selects the appropriate clock signal phases based upon the received data. There are a variety of different applications that can use CDR circuits including, but not limited to, programmable logic devices (PLDs).

PLDs are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect Express (PCIe) and Ethernet and so forth.

Each programmable tile can include both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are often programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

The internal delay or latency of CDR circuits, in various implementations, can have significant impact to the system performance. A CDR circuit that is configured to provide phase control signals from received data with a low latency can be useful for addressing such issues.

SUMMARY

Certain implementations are directed toward a clock data recovery device that includes a phase change determination circuit configured to: detect a phase difference between a data signal and a clock signal; and generate, based upon the detected phase difference, a delta signal and a delta selection signal. A speculative calculation circuit can include a first calculation circuit configured to generate a first set of phase interpolation (PI) codes from a first prior value of the delta signal; a second calculation circuit configured to generate a second set of PI codes from a second prior value of the delta signal; a third calculation circuit configured to generate a third set of PI codes from a speculative value of the delta signal that is based upon the first prior value and the second prior value of the delta signal; and a selection circuit configured to select, in response to the delta selection signal, between the first, second, and third sets of PI codes to provide the selection as an output of the clock data recovery device.

Various implementations are directed toward a method for recovering a clock signal for a data signal using a clock data recovery circuit. The method includes detecting a phase difference between the data signal and a clock signal; generating, based upon the detected phase difference, a delta signal and a delta selection signal based upon the detected phase difference; generating a first set of phase interpolation (PI) codes from a first prior delta value of the delta signal; generating a second set of PI codes from a second prior delta value of the delta signal; generating a third set of PI codes from a speculative delta value of the delta signal that is based upon the first prior value and the second prior value of the delta signal; and selecting, in response to the delta selection signal, between the first, second, and third sets of PI codes to provide the selection as an output of the clock data recovery circuit.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Various implementations are directed toward a clock data recovery (CDR) circuit that is configured to provide phase control signals from received data with a reduced number of cycles relative to CDR circuits that do not use speculative values. The number of cycles can be by speculating values for a delta signal that is used for internal calculations within the CDR circuit. This is in contrast to CDR circuits that are subject to serial delays in signal and data processing. As discussed herein, the delta signal can represent an incremental change to the phase accumulator of a capture clock signal as determined by a phase detection circuit. Particular implementations allow for phase control signals to be available within a single cycle. The phase control signals can be generated for different delta signal values, and the desired phase control signals can be selected once the actual delta signal value is determined by the CDR circuit. In particular implementations, the phase control signals can be phase-interpolation (PI) codes that are used to select different phases in order to synchronize the clock signal with the received data. In some implementations, the delta signal can include data from a frequency path circuit that is configured to provide a clock frequency adjustment component. As used herein, the term "cycles" is relative to a reference clock signal used to store intermediate data within the CDR circuit.

Using speculative delta signals to generate speculative PI codes allows for the PI code generation to be, at least partially, decoupled from the (actual) delta signal determination. This can be useful because the actual delta signal determination can include time consuming processes such as the detection of phase differences and determination of a step value, as discussed in more detail herein. By decoupling the generation of the speculative PI codes from the calculation of the detected phase differences and step value, the calculations of corresponding speculative PI codes can be carried out earlier (e.g., without knowledge of the actual delta signal value). In certain implementations, the calculation of the PI codes from a known delta value can take enough time to require an additional CDR cycle. Accordingly, speculative generation of the PI codes, from speculative delta signal values, can be used to reduce the overall latency of the CDR circuit.

Particular implementations are directed toward a CDR circuit that includes a phase path circuit. The phase path circuit (or just "phase path") is configured to receive a data signal and a clock signal. The phase path circuit is configured to generate signals that indicate what adjustments (if any) to the clock signal will improve the synchronicity between the clock signal and the data signal. As discussed in more detail herein, the phase path circuit can include both speculative and parallel computations that can be useful for reduced delay between the receipt of the data signals and the generation of the phase selection signals.

Consistent with certain implementations, the phase path circuit can include boundary registers that are fed with incoming data and signal crossings. A plurality of bang-bang phase detectors generate the information regarding the capturing phase with respect to the data eye. The net difference between detected phase directions (e.g., "UPs" and "DOWNs") from the multiple phase detectors are factorized to form a raw step-size, which is combined with frequency path contribution to become the final incremental (called "Delta") to both the data and crossing phase accumulators, respectively. PI codes for the data and crossing phases are generated through a filtering process.

Consistent with various implementations, the different delta values used to generate speculative PI codes represent different available delta values for the CDR circuit to select. While the actual delta value, as calculated for the current cycle, may not match any of the delta values used to generate speculative PI codes, the CDR circuit can be configured to select a speculative PI code that is close to the actual delta value. Particular aspects of the present disclosure relate to the recognition that the delta value can include a hysteresis component in that the actual delta value depends, at least partially, from the prior delta values. For example, the speculative delta value discussed herein can be generated based upon the prior delta values (e.g., using an algorithm that takes into account the direction and quantity of change between prior delta values).

Figure 1:
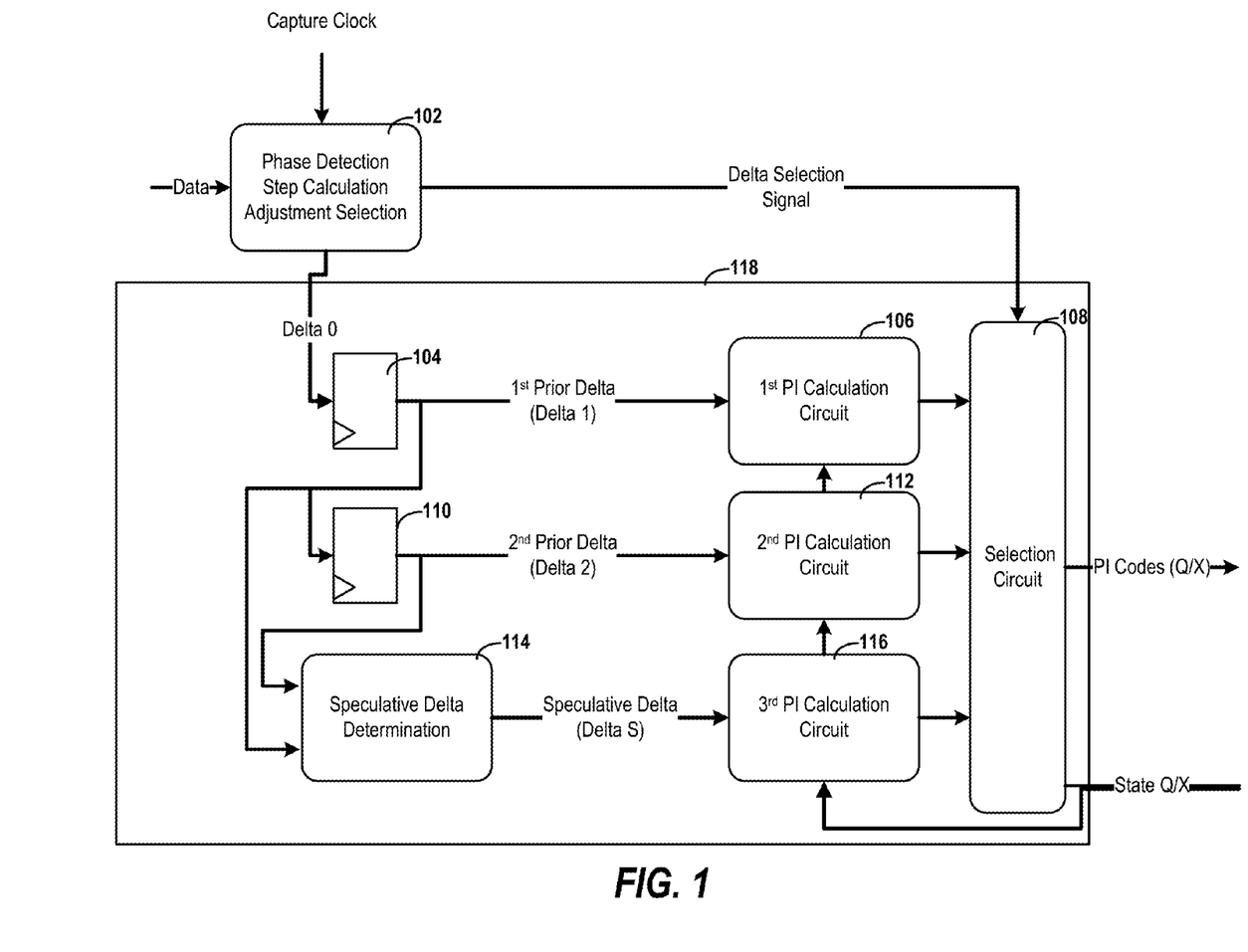
FIG. 1 depicts a block diagram for a CDR circuit with speculative calculations of (phase interpolation) codes, consistent with implementations of the present disclosure.

Turning now to the figures, FIG. 1 depicts a block diagram for a CDR circuit with speculative calculations of (phase interpolation) codes, consistent with implementations of the present disclosure. The CDR circuit can include a phase path with a phase detection circuit 102 that can be configured to detect phase differences between a received data signal and a capture clock signal that is generated from, or phase matched to, the data signal. As discussed herein, the capture clock signal can be generated by selecting between a plurality of clock signals, each having a relative phase offset from one another. More particularly, the PI codes from the CDR circuit can control the selection of an appropriate clock signal to be used for capture of the data. The phase detection circuit 102 can also be configured to calculate a step value that is based upon a summation of the detected phase differences between the capture clock signal and a plurality of data signals. The delta value for each iteration is dependent upon the determined step value. As such, the phase detection circuit 102 can be configured to generate a delta selection signal from the step value. The delta selection signal represents the actual delta value for the current iteration and can then be used with the depicted speculative calculation circuit 118 to select between different PI codes that were pre-calculated based upon different potential values for a delta signal.

Various implementations are based upon a recognition that, for a particular CDR iteration, the determined delta value is a function of the delta signal values from prior CDR iterations. In the depicted implementation, the delta selection signal is based upon the current phase detected information while two prior values of the delta signal are used to predict the current phase code. In particular, the delta value from a current iteration of the CDR circuit (or "Delta 0") is stored in a register 104 for use in the next cycle, and the cycle afterwards. During each CDR iteration, the register 104 is updated with a new, more recently determined, prior delta signal value. During the next CDR iteration, the Delta 1 value (formally Delta 0) is provided to a first PI calculation circuit 106 to generate a first set of PI codes. Also for each CDR iteration, the value stored in register 104 is forwarded to, or stored in, register 110 and becomes the second prior delta signal (or "Delta 2"). The Delta 2 value in the register 110 is provided to a second PI calculation circuit 112 to generate a second set of PI codes.

Consistent with implementations, each of the first (Delta 1) and second (Delta 2) prior delta values can then be used by a speculative delta determination circuit 114 to produce a speculative delta value (Delta S). The Delta S value can be provided to a third PI calculation circuit 116 to generate a third set of PI codes. In particular implementations, the speculative delta determination circuit 114 can be configured to calculate the speculative value of the delta signal using a linear projection that is derived from the first and second prior values. For instance, the speculative value can be selected such that the rate of change between the first and second prior values is the same as the rate of change between the first and speculative values.

In various implementations, the Delta 1 and Delta 2 can include an adjustment factor relative to the prior values. For example, rather than using the exact delta values as calculated from prior iterations, the Delta 1 and Delta 0 values can be adjusted up or down. This might include, for instance, scaling (reducing) one or both of the Delta 0 and Delta 1 values when the Delta S value would otherwise exceed a threshold value, such as the upper value that the system allows for the delta change. This can allow the Delta S value to stay within the limits of the system. Other adjustments are also possible.

Consistent with certain implementations, the calculation of the speculative delta value (Delta S) can be carried out using a non-linear approximation. This may include, for example, interpolating delta values between the Delta 1 and Delta 2 values. The system can then identify a non-linear algorithm that matches the delta values, including the interpolated values. The identified non-linear algorithm can then be used to determine the Delta S value. This might also include storing more than two prior delta values (e.g., Delta 3) and using the additional delta value(s) to identify a non-linear algorithm. Combinations thereof are also possible.

As discussed herein, first PI calculation circuit 106 can be configured to receive the first prior delta signal from register 104 and to produce PI codes that would correspond to the first prior delta signal. Similarly, second PI calculation circuit 112 can be configured to receive the second prior delta signal from register 110 and to produce PI codes that would correspond to the second prior delta signal. Third PI calculation circuit 116 can be configured to receive a speculative delta signal and produce PI codes that would correspond to the speculative delta signal. Once the phase detection circuit 102 has determined enough information from the input data and capture clock signal, a delta selection signal can be provided to selection circuit 108. The selection circuit 108 can then be used to select the appropriate PI codes. For instance, the selection circuit 108 can operate as a multiplexor that selects between different speculative signals and their corresponding values, e.g., PI codes. The output of the multiplexor is then provided as the final/actual value for the selected signal(s). As depicted in FIG. 1, the selection circuit 108 can also be configured to provide the state signal information as a feedback/input to the speculative calculation circuit 118.

The PI calculation circuits (106, 112, 116) can generate the PI codes from the respective delta values using a variety of different techniques and solutions, the specifics of which would depend upon the particular application and are beyond the scope of this disclosure. For instance, the PI calculation circuits can be configured to generate the PI codes based upon both information for the current CDR iteration and upon information from previous CDR iteration(s). As such, the PI calculation circuits can be configured to receive state information relative to the prior CDR iterations and account for this information (e.g., using an accumulator). In a particular example, previous state information can be included in the PI calculation using phase accumulators in the PI calculation circuit (106, 112, 116).

Figure 2:
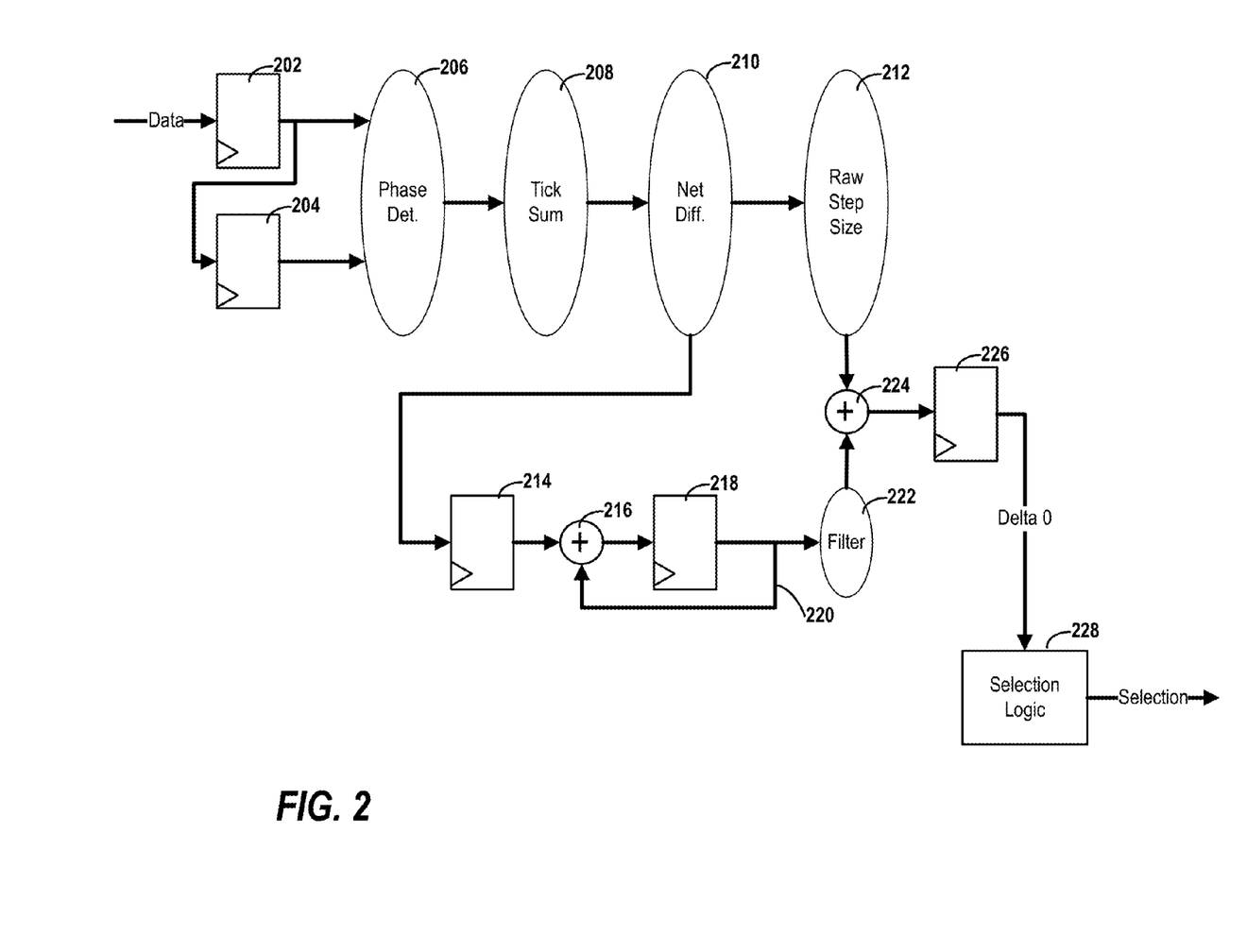
FIG. 2 depicts a block diagram for a phase detection circuit for use with speculative computations, consistent with various implementations.

FIG. 2 depicts a block diagram of a phase detection circuit for use with speculative computations, consistent with various implementations. Unless otherwise stated, the components (blocks) of the block diagram can be implemented in the digital realm, the analog realm, or combinations thereof. For example, some components are referred to as circuits, which can be separate, dedicated circuits for each block, or one or more of the blocks can be carried out by a common circuit configured to provide multiple functions. For instance, a single digital processing circuit can be configured and programmed to provide functions of multiple different blocks.

The phase detection circuit depicted in FIG. 2 can be used in combination with implementations discussed herein including the implementations discussed in connection with FIG. 1. Consistent with some implementations, phase detection can be implemented using a bang-bang phase detector in which data is received by a set of data registers 202 and 204. A phase determination circuit 206 can be configured to generate an up down vote for received data relative to the capture clock signal. For simplicity, a single data input is shown, but this detection can be carried out for each data stream of a set of parallel data streams. The parallel data streams can be received from an upstream deserializer logic block (not shown). The detection can indicate a direction (up, down or no change), which is sometimes referred to as a vote. The votes from the parallel detections result in a tick sum determination circuit 208. As such, the tick sum output represents the summation of parallel results from the phase determination from multiple data inputs, which are arranged to be consistent with the parallel data from an upstream deserializer logic block. Due to the nature of the phase detection circuit of the depicted example, three possible results could be generated: increasing/moving-up (+), decreasing/moving-down (−), or no-change/no-move (sometimes also used interchangeable as moving-left, moving-right or no-move). A net difference determination block 210 can determine a net difference that represents the difference between moving-ups and moving-downs, which indicates the direction and raw amount the PI code should move statistically.

The net difference can then be provided to raw step size block 212, which can generate a value that represents an amount of phase change for the current iteration. The net difference can also be provided to, and stored in, register 214. Hysteresis for the net difference values can then be tracked by accumulating past values using combiner 216, register 218 and feedback 220. Filter 222 can be configured to filter the output of register 218 before the output is provided to combiner 224. Register 226 can store the resulting output of combiner 224 so that the output can be provided to selection logic 228 as the delta signal for the current CDR iteration.

Selection logic 228 can determine, based upon the received delta signal, which set of PI values matches the received delta signal and create a corresponding PI phase move. As discussed in more detail herein, the signal "delta 0" serves as the Delta Selection Signal in the FIG. 1. For example, the speculative PI codes can be generated from prior delta signal values (Delta 1 and Delta 2) as well as a speculative delta signal value (Delta S) that is based upon the prior delta signal values. The selection logic 228 is configured to identify which of the corresponding speculative PI codes should be used based upon the Delta 0 value and upon knowledge of the prior delta signal values and the speculative delta signal value. In particular, the selection logic can determine which of the Delta 1, Delta 2 and Delta S signals matches (or is close to) the Delta 0 value will lead to, and select the corresponding set of speculative PI code(s). In particular, the speculation can represent an approximation, or best guess, as to the value of the next delta signal and may, or may not, match the actual value exactly.

Figure 3:
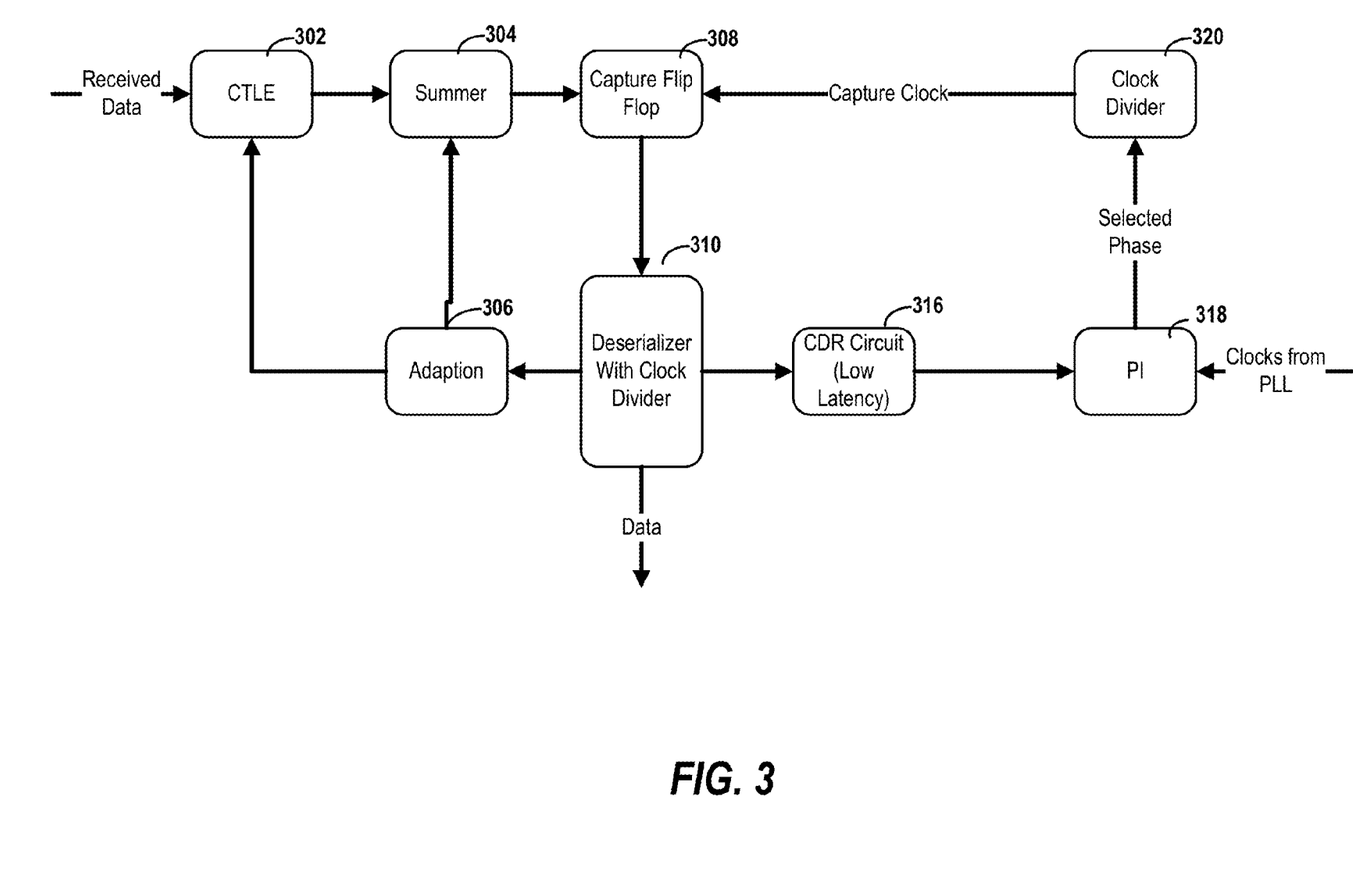
FIG. 3 depicts a block diagram for a system that includes a CDR circuit, consistent with implementations of the present disclosure.

FIG. 3 depicts a block diagram for a system that includes a CDR circuit, consistent with implementations of the present disclosure. A continuous time linear equalizer (CTLE) 302 can be used to compensate for distortion in the received data by producing an equalized data signal, based on feedback from adaptation circuit 306. Adaptation circuit 306 can generate the feedback based upon distortion that is detected from information in the decoded data. The feedback can be used to adjust parameters for the CTLE 302 and also to directly compensate the data using summer circuit 304.

Capture flip flop circuit 308 can store data captured from the equalized data signals based upon provided capture clock signals. The stored data can be provided to a deserializer circuit 310 that generates output data by deserializing the data from the capture flip flop circuits using the clock signal from PI, or from the clock signal divided by the internal clock signal dividers. The deserializer circuit 310 can provide the data to the system for use therein.

As discussed herein, one or more capture clock signals can be recovered from the received data. In certain implementations, the deserializer circuit 310 can provide the deserialized (parallel) data and capture clock signal to CDR circuit 316. The CDR circuit 316 can use CDR techniques consistent with the low latency circuits and solutions discussed herein to generate PI codes. The PI codes can be used by PI circuit 318 to select a clock signal with the desired phase from a set of clock signals that can be provided from a PLL circuit (not shown). The selected clock signal (or a clock signal from clock divider circuit 320) can be used as the capture clock and fed to the capture flip-flop.

It is recognized that the deserialized parallel data to the CDR circuit 316 can fill the entire, or partial, data bus with different CDR operation clock frequencies. Each CDR operation cycle generates N-UI delay, where N represents the deserialization factor. The CDR operation for CDR circuit 316 can take a few cycles S to complete. The CDR total internal delay (latency) $\tau=S*N$, can become significant relative to the delays from other components in the system, and the CDR delay can have significant impact to the system performance. Thus, CDR circuit 316, with improved latency as discussed herein, can reduce the CDR operation cycles S with a reduced deserialization factor N, which normally associates to a higher CDR operation frequency. This can be particularly useful for applications in which the CDR delay of CDR circuit 316 is a significant impact to the system performance.

For example, measurements of existing silicon have shown that use of the CDR circuit 316 can improve the system jitter tolerance comparing with the other CDR circuits. In particular, the jitter tolerance curve for comparable CDR circuits with higher latency can dip at 10.5 MHz and have the eye virtually closed. A CDR circuit 316 with lower latency has been shown to function at the same frequency with better tolerance. Reducing latency of the CDR circuit can be particularly useful for PCI Express 3 or 4 (Peripheral Component Interconnect Express) applications, which can operate at frequencies in excess of 10 MHz.

Figure 4:
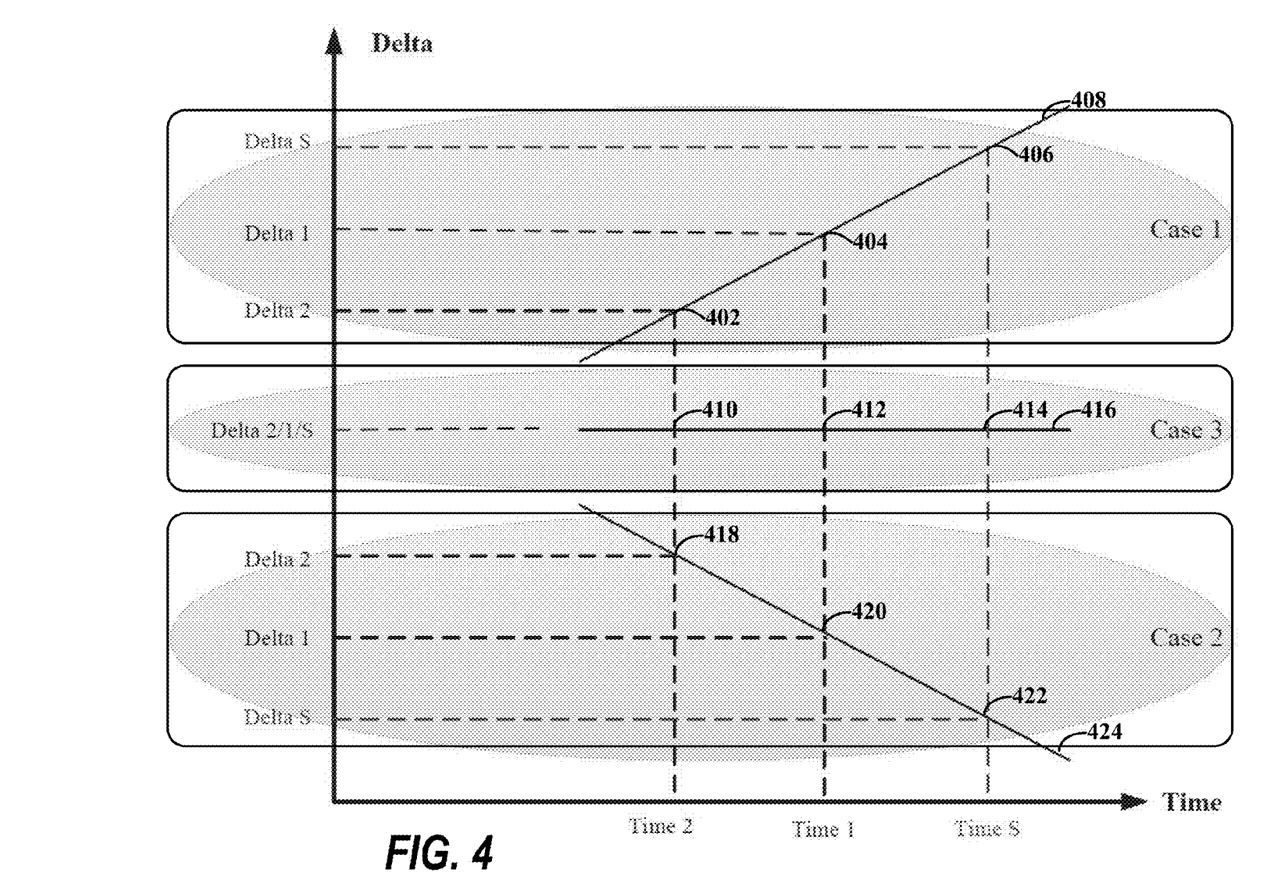
FIG. 4 depicts a graph of possible delta signal values, consistent with implementations of the present disclosure.

FIG. 4 depicts a graph of possible delta signal values, consistent with implementations of the present disclosure. FIG. 4 shows how a speculative calculation circuit (e.g., as described in connection with FIG. 1) can apply an algorithm to determine a speculative delta value. In particular, FIG. 4 shows three different cases, or states, relative to prior delta values ("Delta 1" and "Delta 2"). In each case, the speculative delta value ("Delta S") can be determined based upon the prior delta values. For instance, the speculative value can be determined by determining the rate of delta value change from Delta 2 to Delta 1 and projecting the same (or similar) delta change for the speculative Delta S value.

In Case 1, the delta value is shown as increasing over time from—Delta 2 (402) to Delta 1 (404). As discussed herein, the Delta S value (406) is determined by projecting that the delta value will continue to increase along the line 408. In Case 2, the delta value is shown as decreasing over time—from Delta 2 (418) to Delta 1 (420). The Delta S value (422) is determined by projecting that the delta value will continue to decrease along line 424. In Case 3, the delta value is shown as remaining the same—from Delta 2 (410) to Delta 1 (412). The Delta S value (414) is determined by projecting that the delta value will remain the same along line 416.

It is recognized that, for Case 3, the Delta S value does not predict a deterministic direction for the delta value. This situation might occur when the CDR has successfully locked (or is very close to being locked) to the appropriate dock phase. In such an instance, the detected phase differences can be very small, or even zero, and result in no changes in the delta value. Case 3 might also occur if the CDR has entered a metastable condition where the system is (at least temporarily) stuck. This might occur when the data phase falls in the transition range between different unit intervals (U Is) of the filter. In this case, the phase detectors in the CDR may generate only small differences between UPs and DOWNs, statistically. Sometimes the difference can be zero, which can result in the CDR wandering around a point, but not locking (meta-stability). External interference to the system can cause the CDR to move in a deterministic direction, and the CDR may then move toward a true phase lock.

While in Case 3, a change in the delta value during a CDR iteration will not result in a change in the PI code output for that same iteration. The change, however, would result in the Delta 1 and Delta 2 values being updated such that they are different (Case 1 or Case 2). For example, the actual delta value for a CDR cycle ("Delta 0") might represent an increase relative to the current Delta 1 value. For the next iteration, the Delta 2 value is updated with the previous Delta 1 value, and the Delta 1 value is updated with the previous Delta 0 value. The result is an increase from Delta 1 to Delta 2 (Case 1).

As is apparent from the discussion of Case 3, the latency in response to a Delta value may be higher because a change in Delta 0 value while in Case 3 may not result in a change to the output of the CDR circuit (PI codes) during that corresponding CDR iteration. For CDR iterations after a change, the CDR circuit would resume accurately tracking delta value changes. It is recognized that the latency of the CDR is not necessarily as critical when the CDR is properly locked since the capturing phase has no need to change.

Table 1 depicts a selection logic algorithm for the generation of a delta selection signal for controlling a selection circuit (e.g., as shown with respect to selection circuit 108 of FIG. 1). Consistent with certain implementations, the selection circuit can generate selection signals based upon a comparison of a delta value from a previous CDR iteration (Delta 1) and the delta value for the current CDR iteration (Delta 0), As the comparison between two values can be easily and quickly carried out, the selection signals can be made available to the selection circuit without a need to delay an additional cycle. In other words, the output of the selection circuit can be made available during the same cycle the Delta 0 value for the current CDR iteration is available.

The selection criterion for generation of the selection signals is a comparison of the Delta 0 to the Delta 1 values. For instance, in each instance where Delta 1 is equal to the Delta 0, the Delta 1 speculative values can be selected for both the PI codes and state information. For Case 1, the trend of the delta values is increasing. Thus, the Delta S (speculative delta) values are selected when Delta 0 is higher than the Delta 1, and the Delta 2 values are selected when Delta 0 is lower than Delta 1. The converse is true for Case 2. For Case 3: Delta 1=Delta 2=Delta S. Accordingly, any of the Delta values can be selected (Table 1 shows Delta 1 values as being selected).

TABLE 1

| Selection Criterion | Delta S > Delta 1 | Delta S = Delta 1 | Delta S < Delta 1 |
|---|---|---|---|
| Case 1 | State S -> State Delta S -> PI | State 1 -> State Delta 1 -> PI | State 2 -> State Delta 2 -> PI |
| Case 2 | State 2 -> State Delta 2 -> PI | State 1 -> State Delta 1 -> PI | State S -> State Delta S -> PI |
| Case 3 | | State 1 -> State Delta 1 -> PI | |

Figure 5:
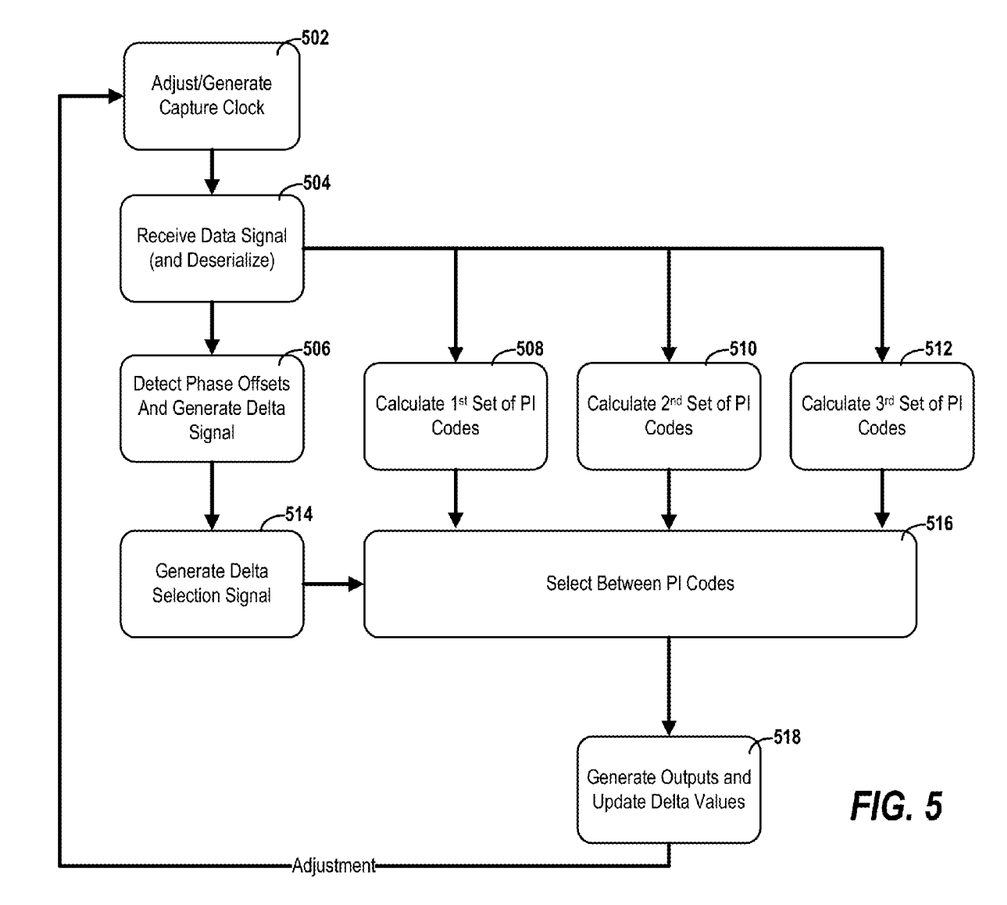
FIG. 5 depicts a flow chart for use with a CDR circuit, according to implementations of the present disclosure.

FIG. 5 depicts, a flow chart for the use a CDR circuit, according to implementations of the present disclosure. Consistent with implementations, the various blocks can represent different actions performed by the CDR circuit and the arrows can represent the timing flow between the actions. It is recognized, that the specific set of actions can be expanded or reduced and that various orderings of the actions can be changed.

A phase locked loop circuit can be configured to generate and/or adjust the phase of a capture clock signal, per block 502. In certain implementations, the phase adjustment can be configured for use with a PI-based CDR circuit in which the adjustment involves the selection of a clock signal from a plurality of clock signals with relative phase offsets. A data signal, for use in recovering a corresponding clock signal of the transmitter, can be received by the CDR circuit, per block 504. Consistent with some implementations, the received data signal can be a serial data signal that is deserialized, also per block 504.

A phase detection circuit can then detect phase differences between the data signal and the capture clock signal to produce a delta signal, per block 506. Concurrently, or at least before the phase detection is completed, speculative PI codes can be calculated for multiple delta values, per blocks 508, 510, and 512. As discussed herein, two delta values can be from prior CDR iterations, and a third delta value can be a speculative/predictive delta value that is based upon the prior data values.

Using the phase detection circuit, a delta selection signal can be generated based upon the detected phase differences and prior delta values, per block 514. The delta selection signal can then be provided to a selection circuit select between the first, second and third set of PI codes, per blocks 516. The selection circuit can then provide the PI codes as outputs, per block 518. Additionally, the delta values used to generate the speculative PI codes can be updated as discussed in more detail herein, per block 518. For instance, the most recently determined delta value can become the new Delta 0 value, the previous Delta 0 value can become the new Delta 1 value and the Delta S value can be calculated from the difference between the new Delta 0 and Delta 1 values. The next CDR iteration can then begin according to block 502.

Figure 6:
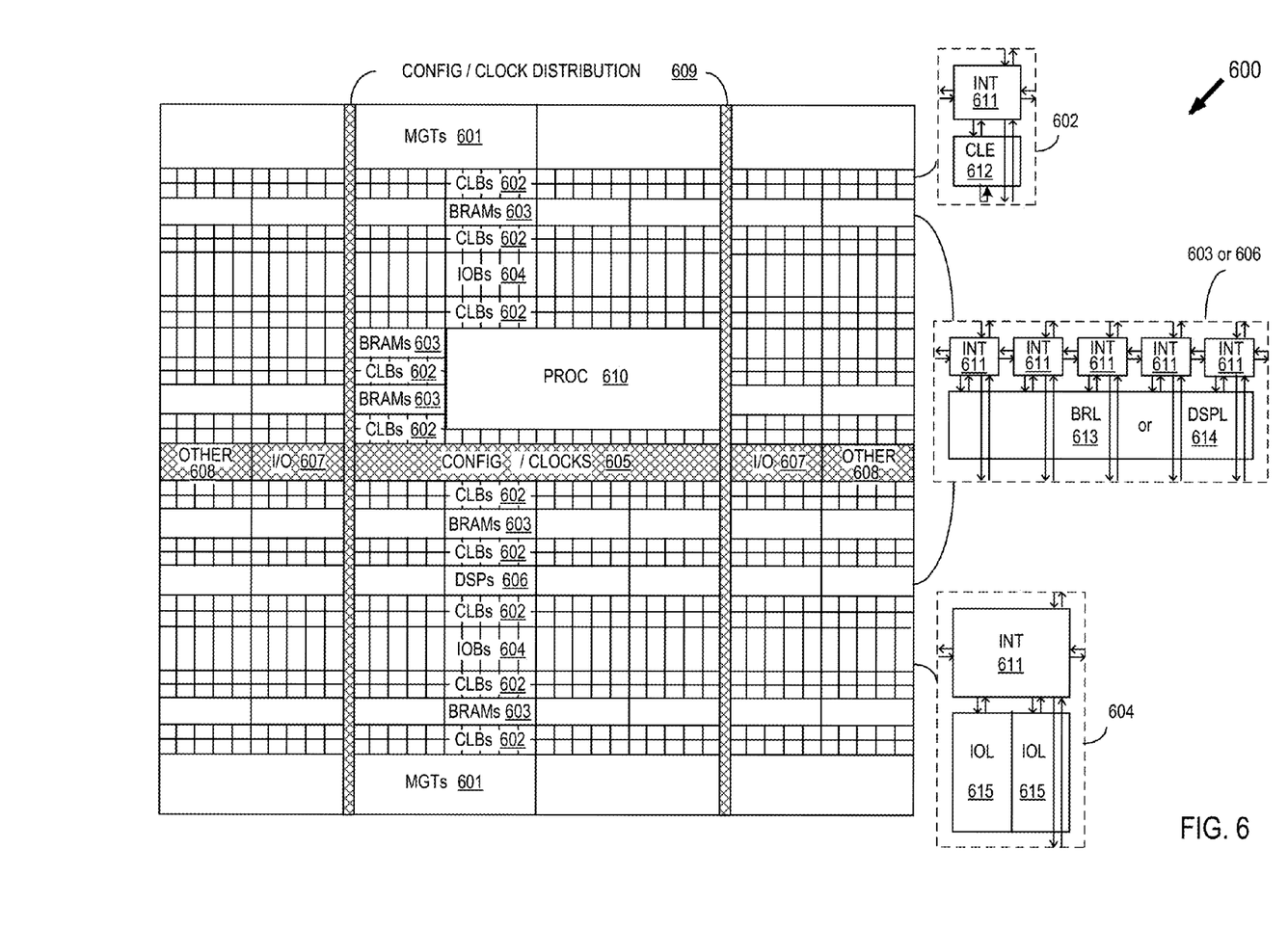
FIG. 6 shows a programmable integrated circuit (IC) 600 on which the disclosed circuits and processes may be implemented.

FIG. 6 shows a programmable integrated circuit (IC) 600 on which the disclosed circuits and processes may be implemented. The programmable IC may also be referred to as a System-on-Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. In some implementations, the I/O can be configured to provide CDR functions, consistent with the circuits discussed here. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. In the pictured implementation, a BRAM tile has the same height as five CLBs, but other numbers (e.g., four) can also be used. A DSP tile 606 can include a DSP logic element (DSPL) 614 in addition to an appropriate number of programmable interconnect elements. An IOB 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

In the pictured implementation, a columnar area near the center of the die (shown shaded in FIG. 6) is used for configuration, clock, and other control logic. Horizontal areas 609 extending from the column are used to distribute the clock signal and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an example programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are merely an example. For example, in an actual programmable IC, more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures that may carry out functions disclosed herein (e.g., frequency determination and control functions). In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use CDR circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. Moreover, the various circuits identified herein may share hardware circuitry, such as use a common computer processing unit or digital processing unit. It is intended that the specification and drawings be considered as examples only, with a true scope of the invention being indicated by the following claims.

What is claimed is:

1. A clock data recovery device comprising:
    a phase change determination circuit configured to:
        detect a phase difference between a data signal and a clock signal; and
        generate, based upon the detected phase difference, a delta signal and a delta selection signal; and
    a speculative calculation circuit that includes:
        a first calculation circuit configured to generate a first set of phase interpolation (PI) codes from a first prior value of the delta signal;
        a second calculation circuit configured to generate a second set of PI codes from a second prior value of the delta signal;
        a third calculation circuit configured to generate a third set of PI codes from a speculative value of the delta signal that is based upon the first prior value and the second prior value of the delta signal; and
        a selection circuit configured to select, in response to the delta selection signal, between the first, second, and third sets of PI codes to provide the selection as an output of the clock data recovery device.

2. The device of claim 1, wherein the speculative calculation circuit is configured to provide a delta signal value from a prior iteration of the clock data recovery device to the first calculation circuit to use as the first prior value of the delta signal.

3. The device of claim 2, wherein the speculative calculation circuit is configured to provide a delta signal value from an iteration that is before the prior iteration of the clock data recovery device to the second calculation circuit to use as the second prior value of the delta signal.

4. The device of claim 1, wherein the speculative calculation circuit is further configured to calculate the speculative value of the delta signal by a linear projection from the first and second prior values of the delta signal.

5. The device of claim 1, wherein the speculative calculation circuit is further configured to calculate the speculative value of the delta signal by a non-linear projection from the first and second prior values of the delta signal, and from additional delta values.

6. The device of claim 1, wherein the phase change determination circuit is further configured to generate the delta selection signal by a comparison of the first prior value of the delta signal with a value of the delta signal for a current iteration of the clock data recovery device.

7. The device of claim 1, wherein each of the first, second and third calculation circuits is configured to generate respective state information.

8. The device of claim 1, wherein the phase change determination circuit includes a plurality of bang-bang phase detectors that are configured to detect phase differences between deserialized data of the data signal and the clock signal.

9. The device of claim 8, wherein the phase change determination circuit is configured to summation results from plurality of bang-bang phase detectors.

10. A method for recovering a clock signal for a data signal using a clock data recovery circuit, the method comprising:
    detecting a phase difference between the data signal and a clock signal;
    generating, based upon the detected phase difference, a delta signal and a delta selection signal based upon the detected phase difference;
    generating a first set of phase interpolation (PI) codes from a first prior delta value of the delta signal;
    generating a second set of PI codes from a second prior delta value of the delta signal;
    generating a third set of PI codes from a speculative delta value of the delta signal that is based upon the first prior value and the second prior value of the delta signal; and
    selecting, in response to the delta selection signal, between the first, second, and third sets of PI codes to provide the selection as an output of the clock data recovery circuit.

11. The method of claim 10, wherein the first prior value of the delta signal corresponds to a delta signal value from a prior iteration of the clock data recovery circuit.

12. The method of claim 11, wherein the second prior value of the delta signal corresponds to a delta signal from an iteration that is before the prior iteration of the clock data recovery circuit.

13. The method of claim 10, further comprising calculating the speculative delta value of the delta signal using a linear projection from the first and second prior values of the delta signal.

14. The method of claim 10, further comprising calculating the speculative delta value of the delta signal using a non-linear projection from the first and second prior values of the delta signal, and from additional delta values.

15. The method of claim 10, wherein generating the delta selection signal is based upon a comparison of the first prior value of the delta signal with a value of the delta signal for a current iteration.

16. The method of claim 10, further comprising generating state information for the first prior value of the delta signal, the second prior value of the delta signal, and the speculative delta value of the delta signal.

17. The method of claim 10, further comprising using a plurality of bang-bang phase detectors to detect phase differences between deserialized data of the data signal and the clock signal.

18. The method of claim 17, further comprising summing results from plurality of bang-bang phase detectors.

19. The method of claim 10, further comprising scaling the first prior delta value of the delta signal in response to the speculative delta value otherwise exceeding a threshold value for the delta change.

20. The method of claim 10, further comprising scaling the second prior delta value of the delta signal in response to the speculative delta value otherwise exceeding a threshold value for the delta change.

* * * * *